United States Patent [19]

Terao et al.

[11] Patent Number: 4,668,573
[45] Date of Patent: May 26, 1987

[54] THIN FILM FOR RECORDING DATA

[75] Inventors: Motoyasu Terao, Nishitama; Tetsuya Nishida, Kokubunji; Yasuhiro Ohta, Yokohama; Shinkichi Horigome, Tachikawa; Yasushi Miyauchi, Hachioji, all of Japan

[73] Assignee: Hitachi, Ltd., Tokyo, Japan

[21] Appl. No.: 819,259

[22] Filed: Jan. 16, 1986

[30] Foreign Application Priority Data

Jan. 25, 1985 [JP] Japan .................................. 60-10852

[51] Int. Cl.$^4$ ........................ B32B 9/00; B32B 27/36
[52] U.S. Cl. .................................... 428/336; 428/412; 428/416; 428/418; 428/522; 428/473.5; 428/474.4; 428/521; 428/523; 428/432; 428/433; 428/442; 428/458; 428/461; 428/463; 428/688; 428/689; 428/913; 346/76 L
[58] Field of Search ................ 428/688, 689, 336, 913

[56] References Cited

U.S. PATENT DOCUMENTS 2,885,309  5/1959  Brunke ................................. 428/688
4,069,487  1/1978  Kasai et al. ..................... 428/688 X Primary Examiner—P. C. Ives
Attorney, Agent, or Firm—Antonelli, Terry & Wands

[57] ABSTRACT

A thin film for recording data which is formed on a substrate directly or via a protection layer, and which develops change in the arrangement of atoms upon irradiation with a recording beam, wherein an average composition in the direction of film thickness is represented by the general formula, $$A_X B_Y C_Z D_\alpha E_\beta$$

wherein X, Y, Z, $\alpha$ and $\beta$ are values that lie over the ranges of $0 \leq X < 30$, $0 \leq Y \leq 40$, $0 \leq Z \leq 70$, $15 \leq Y+Z \leq 70$, $10 \leq \alpha \leq 65$, $20 \leq \beta \leq 70$, E denotes at least one element between Se and S, D denotes at least one element among As, Sb, Si and Ge, C denotes at least one element among Bi, Sn and Pb, B denotes at least one element among Cu, Ag, Au, Sc, Y, Ti, Zr, V, Nb, Cr, Mo, Mn, Fe, Ru, Co, Rh, Ni and Pd, and A denotes an element or elements other than those elements denoted by E, D, C and B.

10 Claims, 3 Drawing Figures

THIN FILM FOR RECORDING DATA

BACKGROUND OF THE INVENTION

The present invention relates to a thin film for recording, data, which is capable of recording, in real time frequency-modulated, video or audio analog signals by a recording beam such as laser beam and electron beam, or which is capable of recording, in real time, digital information such as data of an electronic computer, facsimile signals, or digital audio signals.

There have been proposed a variety of principles for recording data on a thin film using a laser beam. Among them, the recording based upon the change in the arrangement of atoms such as phase transition (or often called phase change) of a film material or photodarkening, is advantageous in that the film is deformed very little and that a double-sided disc can be obtained by directly adhering two pieces of discs. By suitably selecting the composition, furthermore, it is possible to rewrite the data. A number of patent applications have been filed in connection with the recording of this type, and the earliest invention has been disclosed in Japanese Patent Publication No. 26897/1972, which teaches many thin films of the Te-Ge system, As-Te-Ge system, Te-O system, and others. Also, Japanese Patent Laid-Open No. 41902/1979 teaches a variety of compositions such as $Ge_{20}Tl_5Sb_5Se_{70}$, $Ge_{20}Bi_{10}Se_{70}$, and the like. Furthermore, Japanese Patent Laid-Open No. 24039/1982 discloses thin films composed of $Sb_{25}Te_{12.5}Se_{62.5}$, $Cd_{14}Te_{14}Se_{72}$, $Bi_2Se_3$, $Sb_2Se_3$, $In_{20}Te_{20}Se_{60}$, $Bi_{25}Te_{12.5}Se_{62.5}$, CuSe, and $Te_{33}Se_{67}$ When the film is to be used as a phase transition recording film which permits the data to be written one time or which permits the data to be rewritten, however, the above-mentioned thin films are defective in that they exhibit a slow speed of crystallization, that they absorb little of the semiconductor laser beam and exhibit poor sensitivity, that they reproduce signals of insufficient intensity, that their amorphous state lacks stability, and that their resistance against oxidation is not sufficient. It is, therefore, difficut to put the above-mentioned thin films into practice.

SUMMARY OF THE INVENTION

The object of the present invention is to provide a thin film for recording data which exhibits good recording and reproducing characteristics and which features high sensitivity and increased stability.

The above and other objects of the invention are accomplished by a thin film for recording data which is formed on a substrate directly or via a protection layer which consists of at least one of an inorganic material or an organic material, and which develops change in the arrangement of atoms upon irradiation with a recording beam, wherein the thin film for recording data has an average composition which, in the direction of film thickness, is represented by the general formula,

$$A_XB_YC_ZD_\alpha E_\beta$$

wherein X, Y, Z, $\alpha$ and $\beta$ have values that lie, in terms of atomic percentage (at %), over the ranges of $0 \leq X° 30$, $0 \leq Y \leq 40$, $0 \leq Z \leq 70$, $15 \leq Y+Z \leq 70$, $10 \leq \alpha \leq 65$, $20 \leq \beta \leq 70$, E is at least one element selected from the group consisting of Se and S, D is at least one element selected from the group consisting of As, Sb, Si and Ge, C is at least one element selected from the group consisting of Bi, Sn, and Pb, B is at least one element selected from the group consisting of Cu, Ag, Au, Sc, Y, Ti, Zr, V, Nb, Cr, Mo, Mn, Fe, Ru, Co, Rh, Ni and Pd, and A is an element other than those elements represented by E, D, C and B.

DETAILED DESCRIPTION OF THE PREFERRED EMBODIMENTS

Figure 1:
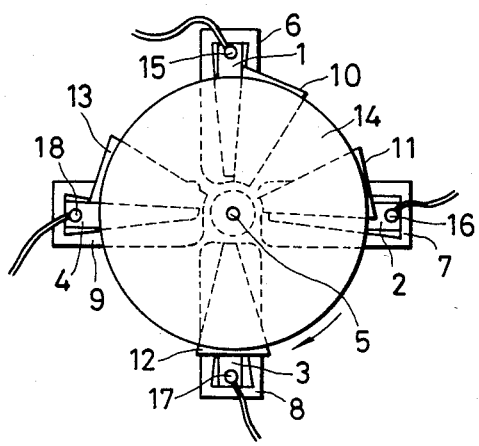
FIG. 1 is a diagram showing the internal structure of a vacuum evaporation apparatus used for producing a recording member according to the present invention.

In the aforementioned general formula, the symbol A denotes at least one element among Ga, In, Tl, Zn, Cd, Hg, B, C, N, P, O, Te, Hf, Ta, W, Pt, Ir, lanthanides, actinides, alkali metals, alkaline earth metals, halogens, and inert gases.

According to the thin recording film of the present invention, the average composition in the direction of film thickness may be varied in the direction of the film thickness provided the average composition in the direction of film thickness lies within the above-mentioned range. Here, the composition should not be discretely changed.

The aforementioned elements play roles as described below. Namely, a non-crystalline state is maintained by the coexistence of an element or elements such as Sb represented by D and an element or elements such as Se represented by E. Elements such as Bi and Ni represented, respectively, by C and B work to increase stability of the amorphous state and to absorb light of long wavelengths such as a semiconductor laser beam to improve the recording sensitivity, and further help increase the change in the reflection factor by recording so that the reproduced signals will have an increased intensity. The element such as Ta represented by A does not exhibit any particularly distinguished effect, but does not produce adverse effect if the amount of its addition is small. Among other elements represented by A, the elements such as Ga, In, Zn and Cd optimize the light transmission factor of the thin film, and work to intensify the reproduced signals.

The this film for recording data of the present invention having a composition that lies over the above-mentioned range, exhibits excellent recording and reproducing characteristics, and requires a laser beam of small power for effecting the recording and erasing. The film further exhibits excellent stability.

More preferably, the values X, Y, Z, $\alpha$ and $\beta$ should lie over the below-mentioned ranges. Namely, $0 \leq X < 5$, $0 \leq Y \leq 30$, $0 \leq Z \leq 55$, $20 \leq Y+Z \leq 55$, $15 \leq \alpha \leq 50$, $30 \leq \beta \leq 65$. Particularly preferably, the value Z should lie over a range of $20 \leq Z \leq 55$, and X should be zero, or $1 \leq Y \leq 30$ and $19 \leq Z \leq 54$.

Among the elements represented by D, the most preferred example is Sb and the second most preferred example is Ge. As for Se and S represented by E, Se should preferably be mainly contained.

Usually, contents of elements change little in the direction of film thickness, but there may exist a change in the contents of elements in any pattern. As for Se and S, the contents thereof should increase toward an surface (or often an interface betwen the layer and another layer) of the thin recording film compared with the interior thereof. This helps increase the resistance against oxidation.

Preferably, at least one surface of the recording film of the present invention should be protected by another substance which is intimately contacted thereto. More preferably, both sides of the recording film should be protected. The protecting layers may be composed of an acrylic resin plate, a polycarbonate resin plate or an epoxy resin plate, which forms a substrate, or may be composed of an organic material such as acrylic resin, epoxy resin, polyimide, polyamide, polystyrene or polyethylene, or may be composed of an inorganic material consisting chiefly of oxide, fluoride, nitride, sulfide, carbide, carbon or metal. Or, the protecting layers may be composed of a composite material thereof. A substrate composed chiefly of glass, quartz, sapphire, iron or aluminum, can also be used as an inorganic protecting layer. Between the organic material and the inorganic material, it is preferred to intimately adhere the inorganic material from the standpoint of resistance against the heat. However, the inorganic layer (except the inorganic substrate) having an increased thickness gives rise to the occurrence of at least any one of cracking, decrease of transmission factor or decrease of sensitivity. Therefore, the inorganic layer should not be formed too thickly but, instead, a thick organic layer should be intimately adhered to the inorganic layer on the side opposite to the side of the recording film. The organic layer may be the substrate. This helps reduce the deformation.

Examples of the organic materials include polystyrene resin, acrylic resin, polycarbonate resin, epoxy resin, ethylene-vinyl acetate copolymer which has been known as a hot-melt adhesive, and sticking agent. Or, the organic material may be an ultraviolet light curing resin. The protecting layer composed of an inorganic material may be deposited from a source of the same composition. However, the step of formation can be simplified if it is formed by the reactive sputtering method, or if a film composed of at least one element of metals, semimetals or semiconductors is formed and then it is reacted with at least any one of oxygen, sulfur or nitrogen. Examples of the inorganic protecting layers include an oxide of at least one element selected from the group consisting of Ce, La, Si, In, Al, Ge, Pb, Sn, Bi, Te and W; a sulfide of at least one element selected from the group consisting of Cd, Zn, Ca, In, Sb, Ge, Sn, and Pb; a selenide; a fluoride of Mg, Ce or Ca; and a compound which consists of a nitride of Si, Al, or Ta, and of which the composition of chief ingredients is close to any one of $CeO_2$, $La_2O_3$, $SiO$, $SiO_2$, $In_2O_3$, $Al_2O_3$, $GeO$, $GeO_2$, $PbO$, $SnO$, $SnO_2$, $Bi_2O_3$, $TeO_2$, $WO_2$, $WO_3$, $CdS$, $ZnS$, $CdSe$, $ZnSe$, $In_2S_3$, $In_2Se_3$, $Sb_2S_3$, $Sb_2Se_3$, $Ga_2S_3$, $Ga_2Se_3$, $MgF_2$, $CeF_3$, $CaF_2$, $GeS$, $GeSe$, $GeSe_2$, $SnS$, $SnSe$, $PbS$, $PbSe$, $Bi_2Se_3$, $Bi_2S_3$, $TaN$, $Si_3N_4$, $AlN$ or $C$.

Among them, a compound having a composition close to $Si_3N_4$ or $AlN$ is favorably used since it has a surface reflection factor which is not too great, and since it is rigid. The next preferred example is a comound having a composition close to $GeO_2$, $Al_2O_3$, $SnO_2$ or $SiO_2$. When the data is to be recorded by phase transition, it is desirable to crystallize the whole recording film in advance. When the substrate is composed of an organic material, however, the substrate cannot be heated at a high temperature. Therefore, the surface of the recording film must be crystallized by another method. In this case, it is recommended to irradiate ultraviolet ray and to effect the heating, to irradiate light from a flash lamp, or to irradiate light from a high-output gas laser. When light is to be irradiated from a gas laser, high efficiency is maintained if the diameter of the light spot (half-value width) is selected to be greater than 5 $\mu$m but smaller than 5 mm. The crystallization may be carried out only on the recording tracks and space among the tracks may remain noncrystallized. It is of course allowable to record data by crystallizing the thin recording film which is under noncrystallized condition. The protecting layers that are formed maintaining a suitable thickness also work to decrease the reflection.

If the thin film is irradiated with light, in general, interference takes place since the light reflected from the surface of the thin film is superposed on the light reflected from the back surface of the thin film. When the signals are to be read relying upon the change in the reflection factor, a light reflecting (absorbing) layer preferably provided close to the recording film, so that the effect of interference increases and signals having increased intensity are read. To further increase the effect of interference, an intermediate layer should be provided between the recording film and the reflecting (absorbing) layer. The intermediate layer also works to prevent mutual diffusion between the recording film and the reflecting layer when the recorded data is to be rewritten. The intermediate layer should be composed of a material that does not overly absorb the light which is used for reading the data. The intermediate layer should have a thickness which is greater than 5 nm but smaller than 400 nm, and should have such a thickness that the reflection factor of the recording material becomes minimum near the wavelength of light for reading the data under the recorded state or the erased state. A reflecting layer may be formed between the recording film and the substrate, or on the opposite side of the recording film. Particularly preferably, the intermediate layer should have a thickness which is greater than 5 nm but smaller than 40 nm. It is also preferable to form the protecting layer composed of the aforementioned inorganic material on the side of the reflecting layer opposite to the intermediate layer.

The recording film according to the present invention may further be formed being dispersed in an oxide, fluoride, nitride or organic material, that is used as a protecting film, relying upon the co-evaporation method or co-sputtering method. This often makes it possible to adjust the light absorption coefficient and to intensify the reproduced signals. As for the mixing ratio, oxygen, fluorine, nitrogen or carbon should not occupy more than 40% in the whole film. In this case, the contents of elements should become equal to the contents of elements of the present invention in the portions excluding the oxygen etc. Usually, formation of such a composite film results in the decrease in the speed of crystallization or decrease in the sensitivity. The sensitivity, however, increases if an organic material is used to form the composite film.

Suitable ranges of film thicknesses are as described below.

Recording film—greater than 60 nm but smaller than 150 nm when the film consists of a single layer, or greater than 15 nm but smaller than 50 nm when the film has a multi-layer structure containing a reflecting layer. It is possible to use recording films up to 300 nm-thick.

Inorganic protecting layer—greater than 5 nm but smaller than 200 nm, or 0.1 to 20 mm when the inorganic substrate is used as the protecting layer.

Organic protecting layer—greater than 10 nm but smaller than 10 mm.

Intermediate layer—greater than 5 nm but smaller than 400 nm.

Light reflecting layer—greater than 5 nm but smaller than 300 nm.

The above layers are formed by any one of vacuum evaporation, evaporation in a gas, ion-beam sputtering, ion-beam deposition, ion plating, electron-beam deposition, injection molding, casting, spin coating, or plasma polymerization.

In the recording film of the present invention, the data need not necessarily be recorded by utilizing the change between the noncrystalline state and the crystalline state, but may be recorded by changing the arrangement of atoms which accompanies changes in the optical properties.

The recording member according to the present invention is not limited to the shape of a disc only but may be formed in any other shape such as tape, card or the like.

The invention will be described below in detail by way of embodiments.

Embodiment 1:

On a substrate 14 is formed a replica of grooves for tracking by using an ultraviolet light curing resin, the substrate 14 being made of a disc-shaped chemically reinforced glass plate having a diameter of 30 cm and a thickness of 1.2 mm. One track is divided into 64 sectors. Track addresses and sector addresses (there portions are called header portions) are formed at the start of the sectors by concave pits on the mountain portions between the grooves. On the substrate 14 is then formed an $Si_3N_4$ layer having a thickness of about 40 nm which works as a reflection preventing layer and as a protecting layer, by magnetron sputtering. The substrate is then placed in a vacuum evaporation apparatus which has an internal structure as shown in FIG. 1. Four evaporation boats 1, 2, 3 and 4 are arranged in the evaporation apparatus. Among them, one boat can be replaced by an electron beam evaporation source. These boats are located under the portions where the data are to be recorded onto the substrate 14, and are positioned nearly on the same circumference with the center axis 5 of substrate rotation as a center. Te, Se, $Sb_2Se_3$ and Ni are introduced into each of the four boats. Masks 6, 7, 8, 9 having a fan-shaped slit, and shutters 10, 11, 12, 13 are arranged between the boats and the substrate. An electric current is permitted to flow into the boats to evaporate the evaporation sources in the boats while rotating the substrate 14 at 120 rpm.

The amounts of evaporation from the boats are detected by quartz oscillation-type film thickness monitors 15, 16, 17 and 18, and electric currents flowing into the boats are so controlled that the rate of evaporation becomes constant.

Figure 2:
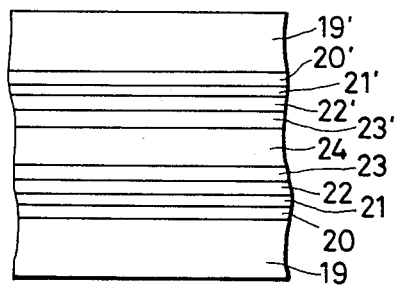
FIGS. 2 and 3 are section views showing the structures of recording members according to embodiments of the present invention.

Referring to FIG. 2, a recording film 21 having a composition $Ni_{10}Bi_{20}Sb_{30}Se_{40}$ is formed to a thickness of about 90 nm on an $Si_3N_4$ layer 20 that is formed on a substrate 19. This film thickness is just the one which minimizes the reflection factor near the wavelength of a laser beam used for reading the data under the condition where the light reflected by the front surface of the recording film and the light reflected by the back surface thereof interfere one another, and where the recording film is assuming the noncrystalline state or is assuming the poorly crystallized state. Then, a protecting layer 22 of a composition close to $Si_3N_4$ is formed to a thickness of about 40 nm by magnetron sputtering. Likewisely, a protecting layer 20' of a composition close to $Si_3N_4$, a recording film 21' of a composition $Ni_{10}Bi_{20}Sb_{30}Se_{40}$ and a protecting layer 22' of a composition close to $Si_3N_4$ are deposited on another similar substrate 19'. Ultraviolet light curing resin layers 23, 23' are applied each in a thickness of about 0.5 $\mu$m onto the evaporated films of the two pieces of substrates 19, 19'. The two substrates are then adhered using an organic adhesive layer 24 with the ultraviolet light curing resin layers on the inside, to thereby prepare a disc.

The thus prepared disc is irradiated from both surfaces thereof with an argon ion laser beam (wavelength of 488 nm) which is focused by a lens having a numerical aperture of 0.05, the disc being rotated and moved in the radial direction, in order to sufficiently crystallize the $Ni_{10}Bi_{20}Sb_{30}Se_{40}$ recording films 21, 21'. The data is recorded as described below. Namely, the disc is rotated at 600 rpm, the light of a semiconductor laser (wavelength of 820 nm) is maintained at a level which does not perform the recording, the light is focused by a lens in the recording head, passed through the substrate, and is permitted to fall on one recording film. The reflected light is then detected, and the head is so driven that the center of light spot is always in agreement with the center between the grooves for tracking. This makes it possible to avoid the effect of noise generated from the grooves. While the tracking is being performed, the automatic focusing is effected such that the focal point exists on the recording film. Then, the laser power is intensified according to the data signals or is returned to the original level in order to record the data. As required, furthermore, the tracking is jumped to other grooves to record the data. Due to the recording of data, the recording film exhibits a change in the reflection factor that is attributable to the change of the recording film from the crystalline state into the noncrystalline state. With this recording film, the data can be erased by being irradiated with a spot of recording light of a decreased power, or by being irradiated with a laser beam which is longer than the spot of recording light in the tracking direction, and which is nearly as wide as the spot of recording light in the direction of neighboring tracks. Addresses of tracks and sectors can be read even by the spot of erasing light if the distance between the neighboring pits that represent addresses is selected to be greater than one-half but smaller than two times the length of spot of the erasing light in the direction of tracks. Further, the length of pits that represent addresses should be greater than one-half the length of the spot of erasing light in the direction of tracks. The same also holds true even for other pits that are formed in the header portions. The recording and erasing can be repeated more than $3 \times 10^5$ times. When the $Si_3N_4$ layers are not formed under and over the recording film, the noise increases to some extent after several times of recording and erasing.

The data is read as mentioned below. That is, the disc is rotated at 600 rpm, and the intensity of the reflected light is detected with a semiconductor laser beam of 1.5 mW to reproduce the data while performing the tracking and automatic focusing in the same manner as during the recording. According to this embodiment, a signal output of about 100 mV is obtained. The recording film of this embodiment exhibits excellent resistance to oxidation. Namely, the recording film of this embodiment, without having a protecting film, is hardly oxidized, even when it is placed under the conditions of a temperature of 60° C. and a relative humidity of 95%.

In the Ni-Bi-Sb-Se recording film, the power of laser beam necessary for effecting the recording and the intensity of reproduced signals change as follows when the sum of Ni and Bi contents is changed while maintaining the relative ratio of other elements constant.

Power of recording laser:

| | |
|---|---|
| Y + Z = 0 | not recorded |
| Y + Z = 10 | not recorded |
| Y + Z = 15 | 12 mW |
| Y + Z = 20 | 8 mW |
| Y + Z = 30 | 8 mW |

In the Ni-Bi-Sb-Se recording film, the intensity of reproduced signals and the crystallization temperature when the film is heated at a predetermined rate are as follows, with the Ni content or the Bi content being changed and the relative ratio of other elements being maintained constant.

Intensity of reproduced signals:

| | |
|---|---|
| Y = 15 | 100 mV |
| Y = 20 | 100 mV |
| Y = 30 | 80 mV |
| Y = 40 | 70 mV |
| Y = 50 | 50 mV |

Stability of amorphous state increases when $1 \leq Y \leq 30$. It is especially preferable to contain both Ni and Bi.

Crystallization temperature:

| | |
|---|---|
| Z = 0 | 170° C. |
| Z = 10 | 160° C. |
| Z = 15 | 140° C. |
| Z = 20 | 130° C. |
| Z = 55 | 100° C. |
| Z = 70 | 80° C. |
| Z = 80 | normal temperature |

The crystallization temperature changes as follows when the film is heated at a predetermined rate, with the Sb content being changed and the relative ratio of other elements being maintained constant.

Crystallization temperature:

| | |
|---|---|
| $\alpha = 0$ | 60° C. |
| $\alpha = 10$ | 80° C. |
| $\alpha = 15$ | 100° C. |
| $\alpha = 30$ | 130° C. |
| $\alpha = 50$ | 100° C. |
| $\alpha = 65$ | 80° C. |
| $\alpha = 80$ | crystallized immediately after the recording. |

The crystallization temperature changes as follows when the film is heated at a predetermined rate, with the Se content being changed and the relative ratio of other elements being maintained constant.

Crystallization temperature:

| | |
|---|---|
| $\beta = 10$ | crystallized as soon as the film is formed. |
| $\beta = 20$ | 80° C. |
| $\beta = 30$ | 100° C. |
| $\beta = 65$ | 100° C. |
| $\beta = 70$ | 80° C. |

When Se is partly or wholly replaced by S, the crystallization temperature decreases slightly but the toxicity decreases.

When Ta is added to the Ni-Bi-Sb-Se recording film while maintaining the relative ratio of other elements constant, the laser power required for the recording changes as follows:

Laser power for recording:

| | |
|---|---|
| X = 0 | 8 mW |
| X = 10 | 8 mW |
| X = 20 | 12 mW |
| X $\geq$ 30 | not recorded |

Nearly the same results are obtained even when elements other than Ta represented by A are used. Among them, at least any one of Ga, In, Tl, Zn, Cd and Hg exhibits the effect to increase the intensity of reproduced signals.

When the thickness of the recording film lies over a range of greater than 60 nm but smaller than 150 nm, large changes in the reflection factor based on the recording is exhibited due to interference of light, and favorable results are obtained. The data can also be recorded and reproduced even when the thickness of the recording film lies over a range of greater than 15 nm but smaller than 300 nm.

Quite similar characteristics are obtained even when Sb is partly or wholly replaced, and at least one element of As, Si or Ge is added.

Quite similar characteristics are also obtained even when Bi is partly or wholly replaced, and at least one element of Sn or Pb is added.

Quite similar characteristics are obtained even when Ni is partly or wholly replaced, and at least one element of Cu, Ag, Au, Sc, Y, Ti, Zr, V, Nb, Cr, Mo, Mn, Fe, Ru, Co, Rh or Pd is added. Furthermore, nickel may be partly or wholly replaced by an element such as bismuth represented by C. In this case, however, the crystallization temperature slightly decreases. Bismuth may be partly or wholly replaced by an element such as nickel represented by B. In this case, however, the intensity of the reproduced signals decreases slightly.

As a protecting film, use can be made of an oxide such as $SiO_2$, a sulfide such as $Sb_2S_3$, a fluoride such as $CeF_3$, or a nitride such as AlN, instead of $Si_3N_4$.

Figure 3:
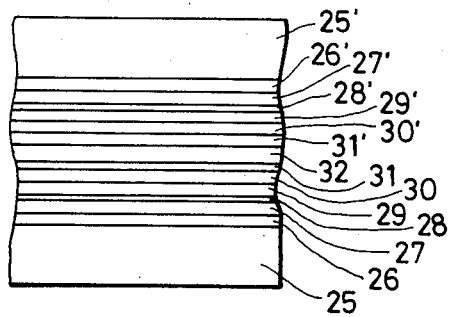

Embodiment 2:

Referring to FIG. 3, use is made as a substrate of a polycarbonate plate 25 formed by the injection molding, with grooves for tracking being formed on the surface thereof. A protecting film 26 is formed thereon by sputtering, having a composition close to $SiO_2$ and a thickness of 40 nm. Then, a recordig film 27 is formed thereon having a composition $Sn_{10}Bi_{20}Sb_{30}Se_{60}$ and a thickness of 30 nm. There are further formed an intermediate layer 28 having a composition close to $SiO_2$ and a thickness of 20 nm, a reflecting layer 29 having a thickness of 60 nm and a composition $Bi_{70}Sb_{30}$, and a protecting layer 30 having a composition close to $SiO_2$ and a thickness of 40 nm. Another substrate is also prepared by the same method, and an ultraviolet light curing resin 31 is applied to a thickness of about 2 μm onto the uppermost SiO$_2$ layers 30 of the two substrates and is cured. Thereafter, the two substrates are adhered using a hot-melt adhesive 32 which contains a black pigment with the ultraviolet light curing resin layers being located on the inside, to thereby prepare a disc.

The crystallization method, recording method, erasing method and reading method are nearly the same as those of embodiment 1.

Instead of SiO$_2$, the intermediate layer may be comprised of other inorganic transparent material such as GeO$_2$, Al$_2$O$_3$, CeO$_2$, AlN or the like, that was mentioned to be utilizable as a protecting layer in embodiment 1, or may be comprised of an organic material. The intermediate layer which has a thickness of 5 to 40 nm is effective to prevent the mutual diffusion between the recording film and the reflecting film at the time of rewriting the data. Optically, however, it can be regarded as if the intermediate layer does not exist. Therefore, the wavelength dependence of the reflection factor which stems from the interference of light is close to that of the two-layer structure which consists of the recording film and the reflection layer.

The intensity of the reproduced signals increases slightly if change in the arrangement of atoms also takes place in the reflecting layer at the time of recording.

Elements C, D, E contained in the recording film may be partly or wholly replaced by at least one other element of the same group. Furthermore, at least one element such as Ta of the group A may be added in an amount of several atomic percent to less than 30 atomic percent. Addition of at least one element such as Cu of the group B helps increase the light absorption and like effects.

The reflection factor decreases when the recording film has a thickness which is greater than 15 nm but smaller than 50 nm and when the recording film is under the noncrystalline condition, and signals of a large intensity are obtained. The reflecting layer should have a thickness of greater than 5 nm but smaller than 300 nm, and preferably a thickness of greater than 40 nm but smaller than 200 nm. Provision of the reflecting layer makes it possible to obtain reproduced signals of a large intensity on a region where the recording film has a thickness that is smaller than that of the single layer as described above. Therefore, good characteristics are obtained even from a composition region where the recording film exhibits a large absorption coefficient.

When the thicknesses of the recording film and intermediate film are changed, the wavelength at which the reflection factor of the reading light becomes minimum due to interference changes. The smallest reflection factor necessary for the automatic focusing and tracking is 10 to 15%. Therefore, the minimum value of the reflection factor which is smaller than the above value must lie on the side of a longer wavelength than the wavelength of the reading light or on the side of a shorter wavelength than the wavelength of the reading light. When the minimum value lies on the side of the shorter wavelength, the thickness of the recording film may be reducer and the loss of energy caused by the heat conduction prevented. Favorably, however, the minimum value should lie on the side of the longer wavelength, so that the film thickness increases and the life of the recording film increases.

Instead of bismuth, the reflecting layer may be composed of a semiconductor such as Bi$_2$Te$_3$, Te, Sn, Sb, Al, Au, Pb, or semimetals, metals, or mixtures thereof, or compounds thereof.

The recording film of this embodiment exhibits excellent resistance against the oxidation like recording film of embodiment 1. For instance, even if the protecting film contains pinholes, the oxidation does not proceed about them.

According to the present invention as described above, it is possible to obtain a recording member which can be formed through a simplified process maintaining good reproduceability, which exhibits good recording and reproducing characteristics, and which stably stores the data for an extended period of time. Furthermore, the recording member permits the data to be rewritten many times.

What is claimed is:

1. In a thin film up to 300 nm thickness for recording information which is formed on a substrate directly or via a protection layer which consists of at least one of an inorganic material or an organic material, wherein the thin film for recording information develops change in the arrangement of atoms on irradiation with a recording beam, the improvement wherein the thin film for recording information has an average composition which, in the direction of film thickness, is represented by the formula, $$A_X B_Y C_Z D_\alpha E_\beta$$

wherein X, Y, Z, α and β are values that lie in the ranges of $0 \leq X < 30$, $0 \leq Y \leq 40$, $0 \leq Z \leq 70$, $15 \leq Y+Z \leq 70$, $10 \leq \alpha \leq 65$, $20 \leq \beta \leq 70$, E denotes Se, D denotes at least one element selected from the group consisting of As, Sb, Si and Ge, C denotes at least one element selected from the group consisting of Bi, Sn and Pb, B denotes at least one element selected from the group consisting of Cu, Ag, Au, Sc, Y, Ti, Zr, V, Nb, Cr, Mo, Mn, Fe, Ru, Co, Rh, Ni and Pd, and A denotes at least one element other than those elements denoted by E, D, C and B;

wherein the thin film for recording information can be repeatedly recorded and erased.

2. A thin film for recording information according to claim 1, wherein an element denoted by D is antimony.

3. A thin film for recording information according to claim 1, wherein an element denoted by D is germanium.

4. A thin film for recording information according to claim 1, wherein X lies over a range of $0 \leq X < 5$.

5. A thin film for recording information according to claim 1, wherein the thickness of said thin film ranges from 60 nm to 150 nm.

6. A thin film for recording information according to claim 1, wherein D denotes at least one element selected from the group consisting of Sb and Ge.

7. A thin film for recording information according to claim 1, wherein said thin film develops a change between the non-crystalline state and the crystalline state upon irradiation with a light beam.

8. A thin film for recording information according to claim 7, wherein said light beam is a laser light beam.

9. A thin film for recording information according to claim 1, wherein A denotes at least one element selected from the group consisting of Ta, Ga, In, Tl, Zn, Cd, Hg, B, C, N, P, O, Te, Hf, W, Pt, Ir, lanthanides, actinides, alkali metals, alkaline earth metals, halogens and inert gases.

10. A thin film for recording information according to claim 1, wherein A denotes at least one element selected from the group consisting of Ta, Ga, In, Tl, Zn, Cd and Hg.

* * * * *